United States Patent
Lan

(10) Patent No.: US 8,327,213 B2
(45) Date of Patent: Dec. 4, 2012

(54) DATA RECEIVING METHOD, ELECTRONIC APPARATUS AND STORAGE SYSTEM HAVING DATA RECEIVING MECHANISM

(75) Inventor: Shih-Hung Lan, Hsinchu County (TW)

(73) Assignee: Silicon Motion Inc., Jhubei, Hsinchu County (TW)

( * ) Notice: Subject to any disclaimer, the term of this patent is extended or adjusted under 35 U.S.C. 154(b) by 330 days.

(21) Appl. No.: 12/775,470

(22) Filed: May 6, 2010

(65) Prior Publication Data
US 2011/0072337 A1 Mar. 24, 2011

(30) Foreign Application Priority Data
Sep. 23, 2009 (TW) .............................. 98132096 A

(51) Int. Cl.
*G08C 25/02* (2006.01)
*H04L 1/18* (2006.01)

(52) U.S. Cl. ..................................................... 714/748

(58) Field of Classification Search .................. 714/748
See application file for complete search history.

(56) References Cited

U.S. PATENT DOCUMENTS

| | | | | |
|---|---|---|---|---|
| 5,590,132 A * | 12/1996 | Ishibashi et al. | ............... | 370/236 |
| 6,031,818 A * | 2/2000 | Lo et al. | ......................... | 370/216 |
| 6,208,663 B1 * | 3/2001 | Schramm et al. | ............. | 370/465 |
| 7,159,162 B2 * | 1/2007 | Ludwig et al. | ................ | 714/748 |
| 7,233,573 B2 * | 6/2007 | Walls et al. | ..................... | 370/236 |
| 7,293,215 B2 * | 11/2007 | Lee | ................ | 714/748 |
| 7,415,722 B2 * | 8/2008 | Tateoka | .......................... | 726/12 |
| 8,086,927 B2 * | 12/2011 | Hoshino et al. | ................ | 714/748 |
| 8,171,363 B2 * | 5/2012 | Soejima et al. | ............... | 714/748 |

* cited by examiner

*Primary Examiner* — James C Kerveros
(74) *Attorney, Agent, or Firm* — Winston Hsu; Scott Margo

(57) ABSTRACT

A data receiving method for an electronic system including a host apparatus and a target apparatus, wherein the host apparatus transmits at least one request to the target apparatus for requesting at least one desired data, and the target apparatus transmits the desired data to the host apparatus according to the request. The data receiving method includes: (a) generating a statistic value according to a number of the requests; (b) varying the statistic value according to a number of the desired data; and (c) determining if data received by the host apparatus is the desired data corresponding to the request according to the static value, and storing the data received by the host apparatus to the host apparatus when the data received by the host apparatus is determined to be the desired data corresponding to the request.

21 Claims, 5 Drawing Sheets

DATA RECEIVING METHOD, ELECTRONIC APPARATUS AND STORAGE SYSTEM HAVING DATA RECEIVING MECHANISM

BACKGROUND OF THE INVENTION

1. Field of the Invention

The present invention relates to a data receiving method, the electronic apparatus and the storage system utilizing the data receiving mechanism, and particularly relates to a data receiving method that can determine which data is necessary data, the electronic apparatus and storage system having data receiving mechanism.

2. Description of the Prior Art

FIG. 1 is a block diagram illustrating a prior art electronic apparatus 100 with data receiving mechanism. Normally, the electronic apparatus 100 includes a host apparatus 101 and a target apparatus 103. For example, a storage system (electronic apparatus 100) includes a memory controller (host apparatus 101) and a storage apparatus such as a SRAM or a DRAM (target apparatus 103). As shown in FIG. 1, the host apparatus 101 transmits a request to request a reading of data, and the target apparatus 103 replies a request receiving confirming information cack to the host apparatus 101. Then the host apparatus 101 transmits an address of the necessary data to the target apparatus 103. After that, the target apparatus 103 transmits data to the host apparatus 101, and the target apparatus 103 transmits a data transmitting notifying information dack to the host apparatus 101 simultaneously with transmitting data.

In order to acquire necessary data, the host apparatus 101 is always designed to continuously send requests to the target apparatus 103. However, the number of the registers in the host apparatus 101 is limited. Take the block diagram shown in FIG. 1 for example, only two registers 105 and 107 exist (i.e. only two data can be registered), thus not all data transmitted from the target apparatus 103 can be registered. Besides, the target apparatus 103 have different time intervals for transmitting data back to the host apparatus 101 in order to response different requests. Therefore, it is difficult for the host apparatus 101 to determine which request does the data being transmitted back corresponds. In other words, not all data, which corresponds to different requests, are necessary data. In this case, it is difficult for the host apparatus 101 to determine if the received data is necessary data or not, thus data receiving error may be caused accordingly.

SUMMARY OF THE INVENTION

Accordingly, one objective of the present invention is to provide a data receiving method and an electronic apparatus and a storage system utilizing the data receiving method, such that the desired data can be correctly determined and stored.

One embodiment of the present invention discloses a data receiving method for an electronic system including a host apparatus and a target apparatus, wherein the host apparatus transmits at least one request to the target apparatus for requesting at least one desired data, and the target apparatus transmits the desired data to the host apparatus according to the request. The data receiving method comprises: (a) generating a statistic value according to a number of the requests; (b) varying the statistic value according to a number of the desired data; and (c) determining whether data received by the host apparatus is the desired data corresponding to the request or not according to the static value, to thereby determine whether the data received by the host apparatus is stored to the host apparatus or not.

Another embodiment of the present invention discloses an electronic apparatus with data receiving mechanism, comprising: a host apparatus; and a target apparatus, wherein the host apparatus transmits at least one request to the target apparatus for requesting at least one desired data, and the target apparatus transmits the desired data to the host apparatus according to the request; wherein the host apparatus generates a statistic value according to a number of the requests, varies the statistic value according to a number of the desired data, and determines whether data received by the host apparatus is data corresponding to the request or not, according to the static value, to thereby determine whether the data received by the host apparatus is stored to the host apparatus or not.

Still another embodiment of the present invention discloses a storage system, comprising: a storage apparatus controller; and a storage apparatus, wherein the storage apparatus controller transmits at least one request to the target apparatus for requesting at least one desired data, and the storage apparatus transmits the desired data to the host apparatus according to the request; wherein the storage apparatus controller generates a statistic value according to a number of the requests; varies the statistic value according to a number of the desired data; and determines whether data received by the storage apparatus is data corresponding to the request or not, according to the static value, to determine whether the data received by the storage apparatus is stored to the storage apparatus or not.

According to above-mentioned embodiment, it can be correctly determined that which data is desired data and controls the host apparatus to receive the desired data, without extra mechanism for synchronizing the information transmission between the host apparatus and the target apparatus.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
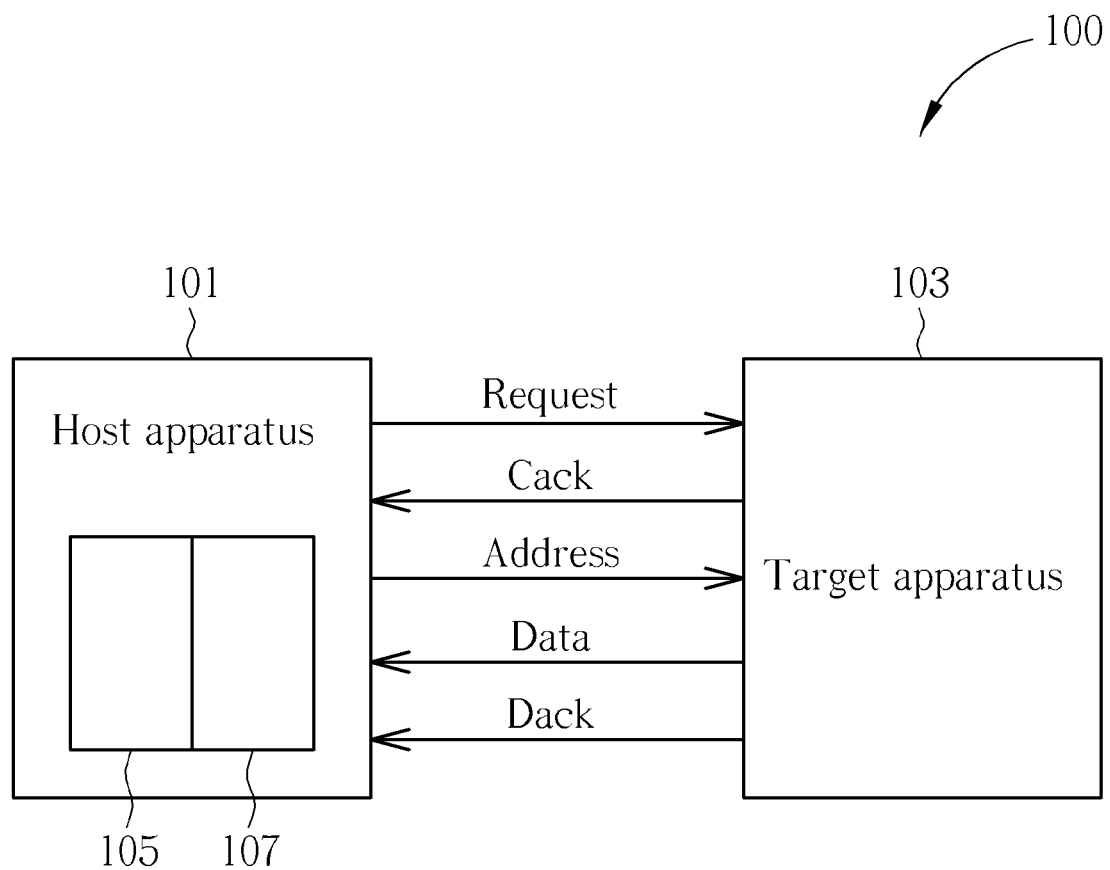
FIG. 1 is a block diagram illustrating a prior art electronic apparatus 100 with data receiving mechanism.
Figure 2:
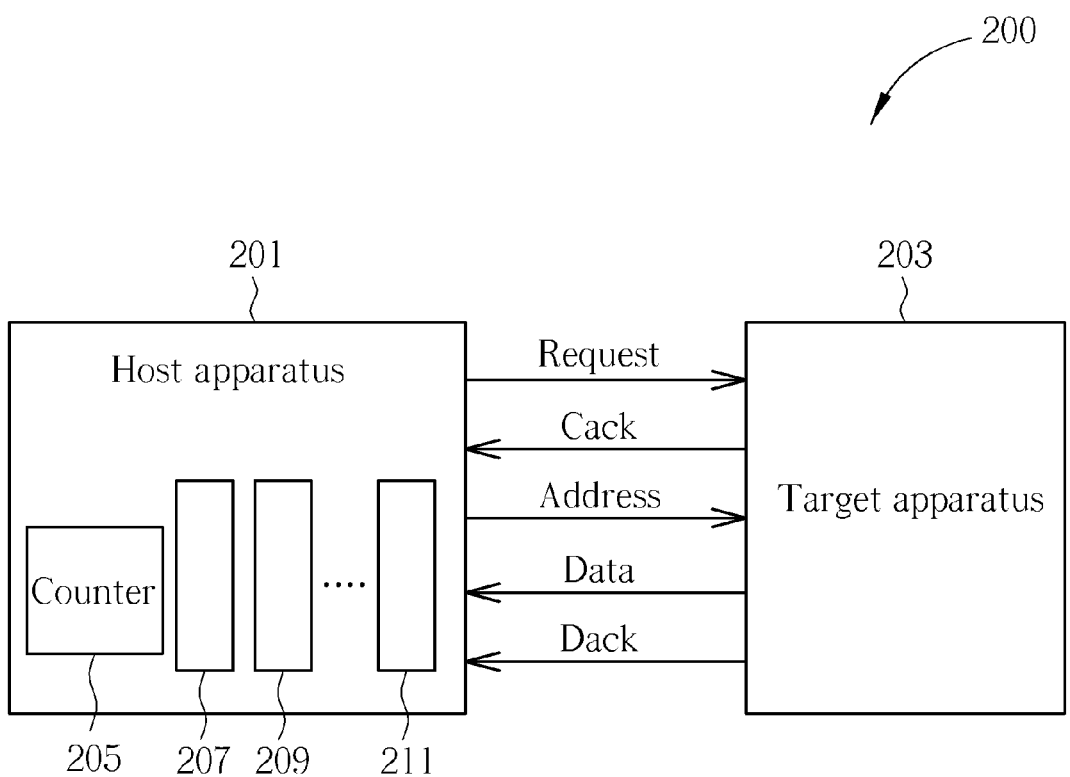
FIG. 2 is a block diagram illustrating an electronic apparatus utilizing a data receiving method according to an embodiment of the present invention.

FIG. 2 is a block diagram illustrating an electronic apparatus utilizing a data receiving method according to an embodiment of the present invention. Comparing the electronic apparatus 200 shown in FIG. 2 with the electronic apparatus 100 shown in FIG. 1, the electronic apparatus 200 also includes a host apparatus 201 and a target apparatus 203. One difference between the electronic apparatuses 100 and 200 is that the host apparatus 201 further includes a counter 205, and a number of the registers 207 . . . 211 is not limited to 2. Also, each of the registers 207 . . . 211 can respectively register a data.

Figure 3:
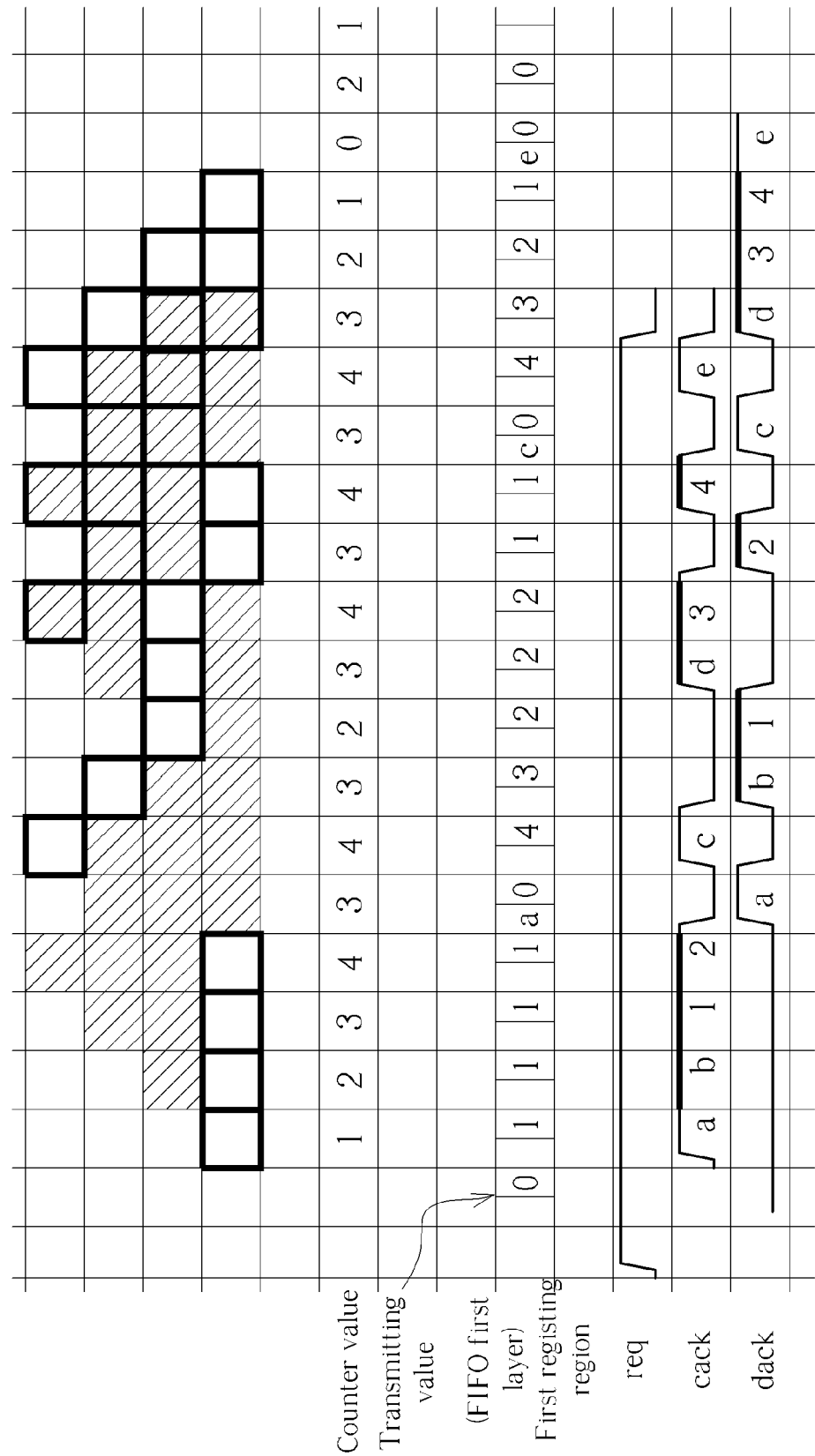
FIGS. 3 and 4 are schematic diagrams illustrating a data receiving method according to an embodiment of the present application.
Figure 4:
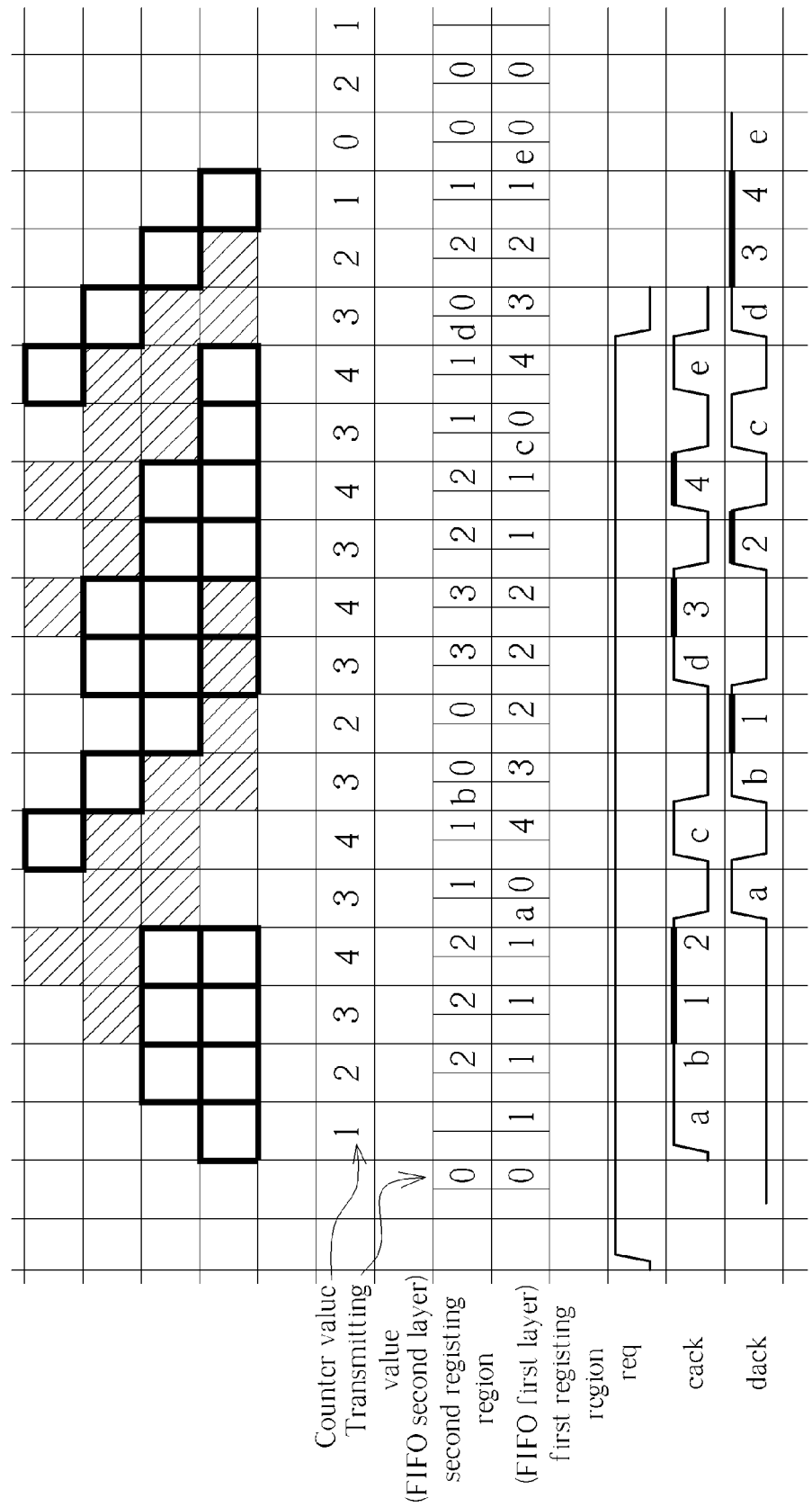

FIGS. 3 and 4 are schematic diagrams illustrating a data receiving method according to an embodiment of the present application. Please note that the apparatus shown in FIG. 2 is utilized to explain the operations shown in FIGS. 3 and 4 in this case, but it does not mean that only the apparatus shown in FIG. 2 can be utilized for the present invention. FIG. 3 is a schematic diagram illustrating that the host apparatus includes only one register. As shown in FIG. 3, the bar graph can indicate a count number value and a transmitting value. For more detail, a number of the units (square) of the bar graph indicates a counter value (all the units with oblique lines or without oblique lines), and a number of the units without oblique lines indicate a transmitting value. The counter value is counted up 1, when the host apparatus 201 receives the request receiving confirming information cack (i.e. a request is generated). After that, the host apparatus 201 fetches the counter value as the transmitting value for the register (i.e. the first in first out layer, FIFO layer) on a suitable timing, when the transmitting value for the register is 0 (the initial value is 0 in this case). The detail operation thereof will be described below. The counter value and the transmitting value simultaneously decrease for 1, when the data transmitting notifying information dack is received (i.e. the data is received). The host apparatus 201 determines that the received data is the desired data and buffers the received data to the register for following accessing.

For more detail, the units without oblique lines indicate that the host apparatus 201 receives the request receiving confirming information cack for desired data, and the units with oblique lines indicate that the host apparatus 201 receives the request receiving confirming information cack for non desired data. For example, the desired data are data a, c, e in this case and the data b, 1, 2, d, 3, 4 are non desired data (or called redundant data). Therefore, the counter value increases for 1, and a unit without oblique lines is added to the bar graph, when the request receiving confirming information cack of a is received. The host apparatus 201 determines the data is the data should be received while receiving it, since no other request receiving confirming information cack is received before the request receiving confirming information cack of the data a. That is, the data a is the desired data. Also, the counter value increases for 1, and a unit with oblique lines is added to the bar graph, when the request receiving confirming information cack of b is received. The host apparatus 201 determines that the data b is non desired data while receiving the request receiving confirming information cack of the data b, since the host apparatus 201 receives the request receiving confirming information cack of the data a before which of the data b and the host apparatus 201 includes only one register but no other buffers for waiting (registering) the data besides data a.

As above-mentioned description, the counter value is fetched as the transmitting value and stored, when the transmitting value of the register is 0. Accordingly, initially the counter value 1 is fetched as the transmitting value in this case. Also, the counter value and the transmitting value both decrease for 1, and one unit of the bar graph is removed, while receiving the data transmitting notifying information dack. Simultaneously, the transmitting value becomes to 0, the master apparatus 201 determines the data a to be desired data, thus stores the data a to the register for the host apparatus 201 to access.

Next, since the transmitting value becomes to 0, thus the counter value 4 is fetched in the next period, as the transmitting and stored to the register. Besides, the transmitting value becomes to 0 indicates that the register successfully registers a desired data, therefore the host apparatus 201 can acquire data from the data, and the register can register other data subsequently. Consequently, the host apparatus 201 receives the request receiving confirming information cack of the data c and determines data c to be desired data when the transmitting value becomes to 0. After that, request receiving confirming information cack and data transmitting notifying information dack of data d,3,4 are received (similarly, data d, 3, 4 are determined to be non desired data at present), and above-mentioned operations are repeated. The transmitting value becomes 0 again while receiving the data transmitting notifying information dack of data. Thus, the host apparatus 201 recognizes that data c is desired data and stores data c to the register. Following the same rule, desired data c can be correctly stored to the register. The reason for why this embodiment can correctly determine which one is correct data is explained as follows. Via record of the transmitting value, it can be pre known that the data a, c, e are desired data, and one request receiving confirming information cack (the cack of data a) is received before receiving data a. Therefore it is speculated that data a is received when one data transmitting notifying information dack is received. After that, four request receiving confirming information cack (the cack of data b, 1, 2 and c) are received. Therefore it is speculated that data c is received when four data transmitting notifying information dack are received (reset to 0 after desired data a is received. Following this rule, it can be correctly determined that which one is desired data.

FIG. 4 is a schematic diagram illustrating that a host apparatus includes two registers. Comparing the embodiments shown in FIG. 3 and FIG. 4, both of them follow the same rules, but one difference there between is that the embodiment shown in FIG. 4 has two registers. Besides, in the embodiment shown in FIG. 4, the desired data are a, b, c, d, e, and the non desired data are 1, 2, 3, and 4. As above-mentioned, the bar graph can indicate counter values and transmitting values. The counter value counts up 1 when the host apparatus receives the request receiving confirming information cack. The counter value is fetched as the transmitting value, when the transmitting value for the register (i.e. a FIFO layer, first in first out device) is 0 (the initial value is 0 in this case). Also, the counter value and the transmitting value simultaneously decrease for 1, when the data transmitting notifying information dack (i.e. data is received) is received. The received data is determined to be desired data and buffered to the register when the transmitting value decreases to 0.

Accordingly, the first register first fetches 1 in the embodiment shown in FIG. 4, and the second register fetches the counter value 2 after a period. Since the host apparatus 201 has two registers in this embodiment, the host apparatus 201 determines that data a, b are data that should be received (i.e. desired data) when the host apparatus 201 receives two request receiving confirming information cack (cack of data a, b) from the target apparatus 203. The transmitting value for the first register is 0 when the data transmitting notifying information dack of data a is received, thus data a is determined to the desired data for the first register. Then, the transmitting value for the first register is 0 when the data transmitting notifying information dack of data b is received, thus data b is determined to the desired data for the second register.

It should be noted that, if the register fetches the counter value as the transmitting value at the moment of data transmitting notifying information dack, the counter value for the register is not updated. In the embodiment shown in FIG. 4, the transmitting value for the second register is 0 when the host apparatus receives data b. However, at the next timing, the host apparatus 201 encounters the data transmitting notifying information dack with data 1, thus the transmitting value of the second register is not updated and maintains 0. Similarly, the transmitting value for the second register is not updated when receives the data transmitting notifying information dack of data d, 3, 4. Via above mentioned description, the concept of the present invention can be utilized to correctly determine desired data for any number of register (i.e. any number of FIFO layers).

Figure 5:
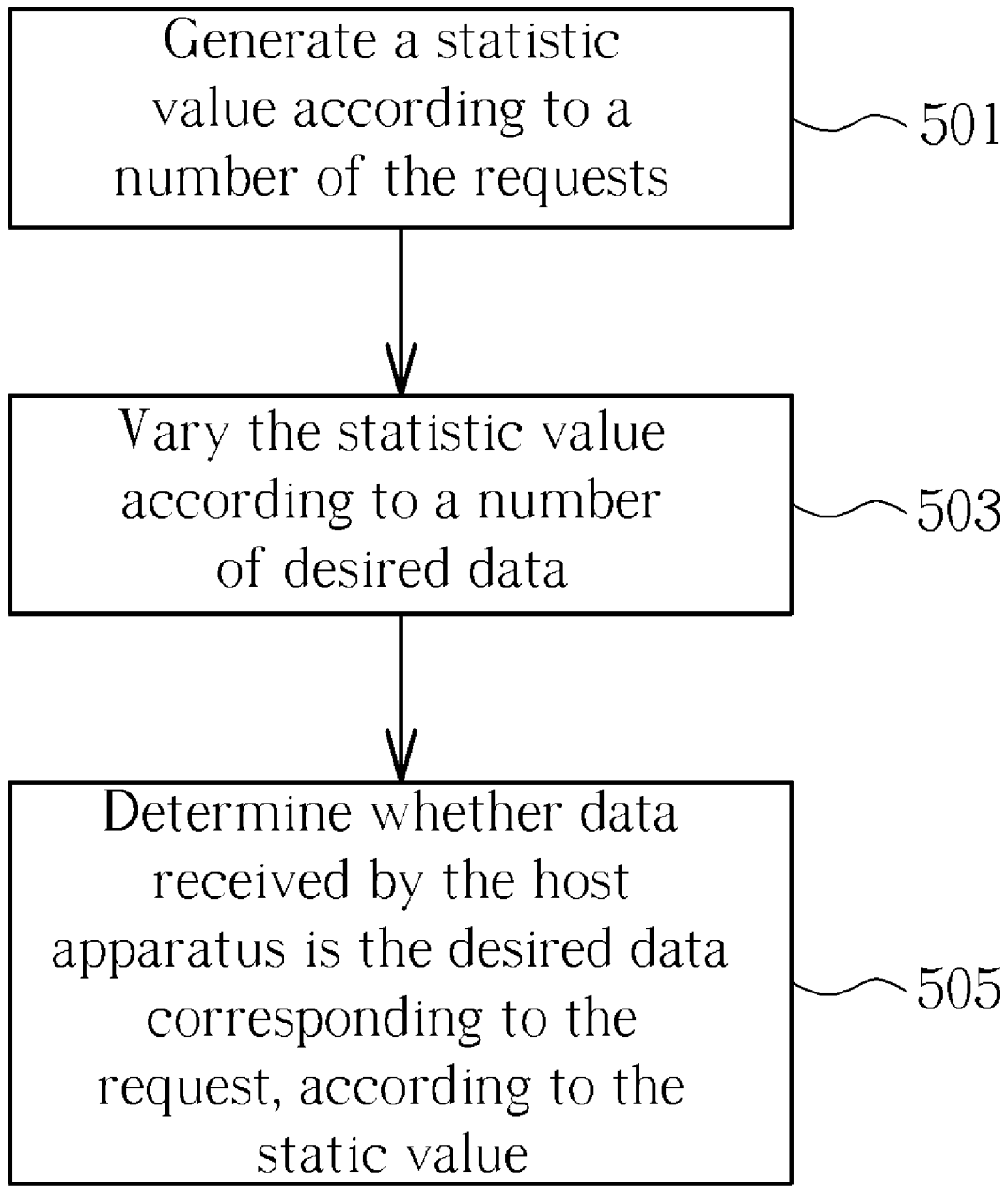
FIG. 5 is a flow chart illustrating a data receiving method according to an embodiment of the present application.

The above-mentioned embodiment can be summarized as the data receiving method shown in FIG. 5. The flow chart in FIG. 5 includes:

Step 501

Generate a statistic value according to a number of the requests (ex. counter value). For above-mentioned embodiments, the request here indicates the request that the host apparatus transmits to the target apparatus for requesting data. In the embodiments shown in FIGS. 3 and 4, the statistic value is generated via compiling the a number of request receiving confirming information cack. Therefore, the step 501 can also be expressed as: generating a statistic value according to a number of the requests, since the number of request receiving confirming information cack substantially equals to a number of the requests.

Step 503

Vary the statistic value according to a number of desired data. In the embodiments shown in FIGS. 3 and 4, the statistic value is varied via compiling a number of data transmitting notifying information dack and varying the counter value according to data transmitting notifying information dack. Therefore, the step 503 can also be expressed as: varying the statistic value according to a number of desired data, since the number of data transmitting notifying information dack substantially equals to a number of desired data.

Step 505

Determine if data received by the host apparatus is the desired data corresponding to the request or not, according to the static value, to determine if the data received by the host apparatus is stored to the host apparatus or not. In above mentioned embodiment, the transmitting value can be regarded as one of statistic values, since the transmitting value is fetched from the statistic value. What does the step 505 indicates is the operation that continuously vary the transmitting value according to data transmitting notifying information dack, and determine the data as desired and store which when the transmitting value is varied to be 0, in the above-mentioned embodiment.

Other detail steps can be easily acquired according to above-mentioned embodiments, thus it is omitted for brevity here.

According to above-mentioned embodiment, it can be correctly determined that which data is desired data and controls the host apparatus to receive the desired data, without extra mechanism for synchronizing the information transmission between the host apparatus and the target apparatus.

Those skilled in the art will readily observe that numerous modifications and alterations of the device and method may be made while retaining the teachings of the invention.

What is claimed is:

1. A data receiving method for an electronic system including a host apparatus and a target apparatus, wherein the host apparatus transmits at least one request to the target apparatus for requesting at least one desired data, wherein the target apparatus transmits the desired data to the host apparatus according to the request, wherein the data receiving method comprises:
(a) generating a statistic value according to a number of the requests;
(b) varying the statistic value according to a number of the desired data; and
(c) determining if data received by the host apparatus is the desired data corresponding to the request according to the statistic value, and storing the data received by the host apparatus to the host apparatus when the data received by the host apparatus is determined to be the desired data corresponding to the request.

2. The data receiving method of claim 1,
wherein the target apparatus responds a request receiving confirming information to the host apparatus after receiving the request;
wherein the target apparatus generates a data transmitting notifying information to the host apparatus simultaneously with transmitting the desired data;
in the step (a), the statistic value is generated according to the request receiving confirming information; and
in the step (b), the statistic value is varied according to the data transmitting notifying information.

3. The data receiving method of claim 2, further comprising:
utilizing a counter to generate a counter value;
in the step (a), the counter value is counted up for generating the statistic value while receiving the request receiving confirming information; and
in the step (b), the counter value is counted down for varying the statistic value while receiving the data transmitting notifying information.

4. The data receiving method of claim 2, wherein the host apparatus further comprises a first register to buffer the desired data, wherein the data receiving method further comprises:
(d) providing a first transmitting value to the first register according to the statistic value;
(e) varying the statistic value and the first transmitting value according to the number of the desired data; and
(f) buffering the desired data to the first register according to the first transmitting value.

5. The data receiving method of claim 4, wherein,
in the step (d), the statistic value is fetched as the first transmitting value in the next period when the first transmitting value is zero; and
in the step (f), the received data is determined as the desired data and the desired data is buffered to the first register when the first transmitting value is varied to be zero in the step (e).

6. The data receiving method of claim 4, wherein the host apparatus further includes a second register to buffer the desired data, wherein the data receiving method further comprises:
(g) providing a second transmitting value to the first register according to the statistic value;

(h) varying the statistic value, the first transmitting value and the second transmitting value according to the number of the desired data; and (i) determining which of the first register and the second register does the desired data belong to according to the first transmitting value and the second transmitting value, and storing the desired data to the register which does the desired data belong to.

7. The data receiving method of claim 6, wherein, in the step (g), the statistic value is fetched as the second transmitting value in the next period when the second transmitting value is zero; and in the step (i), the received data is determined as the desired data and the desired data is buffered to the second register when the second transmitting value is varied to be zero in the step (h).

8. An electronic apparatus with data receiving mechanism, comprising a host apparatus; and a target apparatus, wherein the host apparatus transmits at least one request to the target apparatus for requesting at least one desired data, and the target apparatus transmits the desired data to the host apparatus according to the request;

wherein the host apparatus generates a statistic value according to a number of the requests, varies the statistic value according to a number of the desired data;

wherein the host apparatus determines if data received by the host apparatus is data corresponding to the request, according to the statistic value, and stores the data received by the host apparatus to the host apparatus when the data received by the host apparatus is determined to be the data corresponding to the request.

9. The electronic apparatus of claim 8, wherein the target apparatus responds a request receiving confirming information to the host apparatus after receiving the request;

wherein the target apparatus generates a data transmitting notifying information to the host apparatus simultaneously with transmitting the desired data; and wherein the host apparatus generates the statistic value according to the request receiving confirming information, and the host apparatus varies the statistic value according to the data transmitting notifying information.

10. The electronic apparatus of claim 8, further comprises:

a counter for generating a counter value;

wherein the counter counts up the counter value to generate the statistic value while receiving the request receiving confirming information, and the counter counts down the counter value to vary the statistic value while receiving the data transmitting notifying information.

11. The electronic apparatus of claim 8, wherein the host apparatus further comprises:

a first register to buffer the desired data;

wherein the host apparatus provides a first transmitting value to the first register according to the statistic value; and wherein the host apparatus varies the statistic value and the first transmitting value according to the number of the desired data, and buffers the desired data to the first register according to the first transmitting value.

12. The electronic apparatus of claim 11, wherein the host apparatus fetches the statistic value as the first transmitting value in the next period when the first transmitting value is zero; and wherein the host apparatus determines the received data as the desired data and buffers the desired data to the first register when the first transmitting value is varied to be zero.

13. The electronic apparatus of claim 11, wherein the host apparatus further includes:

a second register, to buffer the desired data;

wherein the host apparatus provides a second transmitting value to the first register according to the statistic value;

wherein the host apparatus varies the statistic value, the first transmitting value and the second transmitting value according to the number of the desired data; and wherein the host apparatus determines which of the first register and the second register does the desired data belong to according to the first transmitting value and the second transmitting value; and stores the desired data to the register which does the desired data belong to.

14. The electronic apparatus of claim 13, wherein the host apparatus fetches the statistic value as the second transmitting value in the next period when the second transmitting value is zero; and wherein the host apparatus determines the received data as the desired data and buffers the desired data to the second register when the second transmitting value is varied to be zero.

15. A storage system, comprising:

a storage apparatus controller; and a storage apparatus, wherein the storage apparatus controller transmits at least one request to the target apparatus for requesting at least one desired data, and the storage apparatus transmits the desired data to the host apparatus according to the request;

wherein the storage apparatus controller generates a statistic value according to a number of the requests;

wherein the storage apparatus varies the statistic value according to a number of the desired data; and wherein the storage apparatus determines if data received by the storage apparatus is data corresponding to the request, according to the statistic value, and stores the data received by the host apparatus to the host apparatus when the data received by the host apparatus is determined to be the data corresponding to the request.

16. The storage system of claim 15, wherein the storage apparatus responds a request receiving confirming information to the storage apparatus controller after receiving the request;

wherein the storage apparatus generates a data transmitting notifying information to the storage apparatus controller simultaneously with transmitting the desired data; and wherein the storage apparatus controller generates the statistic value according to the request receiving confirming information, and varies the statistic value according to the data transmitting notifying information.

17. The storage system of claim 16, further comprises:

a counter for generating a counter value;

wherein the counter counts up the counter value to generate the statistic value while receiving the request receiving confirming information; and wherein the counter counts down the counter value to vary the statistic value while receiving the data transmitting notifying information.

18. The storage system of claim 16, wherein the storage apparatus controller further comprises a first register to buffer the desired data;

wherein the storage apparatus controller provides a first transmitting value to the first register according to the statistic value;

wherein the storage apparatus controller varies the statistic value and the first transmitting value according to the number of the desired data; and wherein the storage apparatus controller buffers the desired data to the first register according to the first transmitting value.

19. The storage system of claim 18, wherein the storage apparatus controller further includes a second register to buffer the desired data;

wherein the storage apparatus controller provides a second transmitting value to the first register according to the statistic value;

wherein the storage apparatus controller varies the statistic value, the first transmitting value and the second transmitting value according to the number of the desired data; and wherein the storage apparatus controller determines which of the first register and the second register does the desired data belong to according to the first transmitting value and the second transmitting value, and stores the desired data to the register which does the desired data belong to.

20. The storage system of claim 19, wherein the storage apparatus controller fetches the statistic value as the second transmitting value in the next period when the second transmitting value is zero; and wherein the storage apparatus controller determines the received data as the desired data and buffers to the second register when the second transmitting value is varied to be zero.

21. The storage system of claim 15, wherein the storage apparatus controller fetches the statistic value as the first transmitting value in the next period when the first transmitting value is zero; and wherein the storage apparatus controller determines the received data as the desired data and buffers to the first register when the first transmitting value is varied to be zero.

* * * * *